Patented Jan. 25, 1949

2,460,073

UNITED STATES PATENT OFFICE 2,460,073

COBALT IODIDE RELATIVE HUMIDITY INDICATORS

Paul Bell Davis, Baltimore, Md., assignor to The Davison Chemical Corporation, Baltimore, Md.

No Drawing. Application February 7, 1945, Serial No. 576,724

6 Claims. (Cl. 252—408)

This invention relates to indicators and more particularly has reference to compositions for indicating the presence and quantity of moisture in a gaseous atmosphere.

An object of this invention is to provide a composition for indicating the presence and quantity of moisture in a gaseous atmosphere within predetermined limits.

Another object of this invention is to provide a composition capable of exhibiting a definite color break when exposed to a gaseous atmosphere having a relative humidity ranging from about 20% to about 30% or from about 40% to about 60%.

A further object of this invention is to provide a moisture indicator formed of cobalt iodide associated with an adsorbent carrier such as silica gel.

Still another object of this invention is to provide a moisture indicator formed of an adsorbent material such as silica gel having $CoI_2$ incorporated in the pores thereof in which the adsorbent characteristics of the carrier, its moisture content, the color changing characteristics of the $CoI_2$, and its concentration, are correlated to produce a definite break in the color of the indicator when exposed to a gaseous atmosphere having a predetermined relative humidity.

It is also an object of this invention to provide a method of making a color changing moisture indicator.

Other objects will appear from the following description.

In accordance with the present invention, it has been found that by treating an adsorbent carrier such as silica gel with a solution of $CoI_2$ and drying the so treated carrier, an indicator gel is obtained which has a definite color and which, upon exposure to a gaseous atmosphere such as air having a predetermined relative humidity, will change its color.

It has also been found in accordance with the present invention that by correlating the adsorptive characteristics of the carrier, its final moisture content as fixed by the temperatures at which the impregnated carrier is dried, or dried and activated, and the concentration of $CoI_2$ in the carrier, the color of the resulting indicator before exposure to an atmosphere and after exposure to an atmosphere of a predetermined humidity can be adjusted or controlled.

The present invention is directed principally to moisture indicators formed of a carrier such as silica gel impregnated with about 2% cobalt iodide and having a definite color change or break when exposed to a gaseous atmosphere such as air having a relative humidity in the range of 20 to 30% or 40 to 60%.

In preparing an indicator according to the present invention, a standard silica gel made by washing an acid reacting hydrogel with an acidic wash water at a temperature of about 150° F., drying and then activating at a temperature of about 850° F. and sized to about 6 to 16 mesh, was employed. This silica gel in the activated form was first treated by exposing it to a humid atmosphere having a high relative humidity to saturate the gel with moisture to such an extent that upon contacting it with a liquid it would not disintegrate like freshly activated gel would if it were contacted with a liquid.

After saturation with moisture to an approximate total volatile content of about 30%, the gel was impregnated with an aqueous solution of cobalt iodide. It has been found that by first saturating the gel with moisture to the extent indicated, wetting of the gel with the cobalt iodide solution can be effected by using only about 50 ml. of solution per kilogram of gel. Of course, more solution can be used if desired. The cobalt iodide solution is of such concentration that by impregnating about one kilogram of the gel with about 50 ml. of solution, the gel will have a $CoI_2$ content of about 2% on the dry basis.

By varying the temperatures at which the gel containing about 2% $CoI_2$ was dried and activated, a color change or break occurred upon exposing the so treated gel to atmospheres having different relative humidities. When the gel having a $CoI_2$ content of about 2% was dried at a temperature of about 250° F. and activated at a temperature of about 400° F., a product was obtained which had a Munsell color value of about 7.5 PB 2/4. This indicator gel was found to be particularly suitable for the indication of the presence of moisture in a gaseous atmosphere such as air when the content of the moisture was such that the atmosphere had a relative humidity ranging between 20 and 30%. For instance, when this indicator gel was exposed to an atmosphere having a relative humidity of about 20%, the color changed to about 7.5 GY 5/2 M. C. V. When this same indicator gel was exposed to an atmosphere having a relative humidity of about 30% the color changed to about 10.0 PB 6/2 M. C. V.

By omitting the activating step and using the gel after drying at 250° F., an indicator gel was obtained which had a definite color break when exposed to an atmosphere having a relative humidity of about 40 to 60%. For instance, by drying the impregnated gel at a temperature of about 250° F. and omitting activation, an indicator was obtained having a color of about 7.5 GY 2/2 M. C. V. Upon exposing this indicator gel to an atmosphere having a relative humidity of about 40%, the color changed to about 2.5 Y 6/6 M. C. V. Upon exposing this same indicator gel to an atmosphere having a relative humidity of 60%, the color further changed to about 2.5 YR 7/4 M. C. V.

In the drying and activating of the above-mentioned gels, the same were held at the temperatures mentioned for about three hours.

While silica gel has been described as the carrier of the chromatic chemical, a porous glass may be used as described in my copending application, Serial No. 576,726 (now abandoned), filed of even date herewith. Such porous glass is made from a glass containing from 60 to 82% $SiO_2$, 20 to 35% $B_2O_3$ and 5 to 10% alkali oxide heat treated at a temperature of 525 or 600° C. to cause the glass to be separated into two phases, one of which is rich in boric oxide and alkali oxide and is soluble in acids, and the other of which is very rich in silica and substantially insoluble in acids. By treating the so heat treated glass with an acid such as hydrochloride, nitric or sulphuric acids maintained at a temperature at or near the boiling point thereof, the acid reacts with the alkaline phase of the glass forming a number of microscopic pores throughout the body thereof. This porous glass may be used in place of the silica gel hereinbefore mentioned.

The values given for the various colors in the foregoing description refer to the system of color notation devised by A. H. Munsell and published by Munsell Color Company, Inc., Baltimore, Maryland, as the Munsell Book of Color, abridged edition, revised 1942.

From the foregoing description, it will be appreciated that the present invention provides an indicator gel particularly suitable for the indication of the relative humidity of an atmosphere. It will also be appreciated that the present invention provides methods of preparing and utilizing indicator gels having color breaks when exposed to atmospheres of different relative humidities.

I claim:

1. A method of preparing a quantitative relative humidity indicator comprising impregnating activated adsorbent silica gel with about 2% of cobalt iodide, and heat treating the impregnated gel, at 250 to 400% F., said indicator changing color when exposed to an atmosphere having a relative humidity of 20–60%.

2. A quantitative relative humidity indicator adapted to change color when exposed to an atmosphere having a relative humidity of 20–60% consisting essentially of silica gel impregnated with cobalt iodide, said indicator having been prepared by the process of claim 1.

3. A method of preparing a quantitative relative humidity indicator comprising impregnating activated silica gel with about 2%, on a dry basis, of cobalt iodide, drying the impregnated silica gel at a temperature of about 250° F., and activating the impregnated silica gel at a temperature of about 400° F., said indicator changing color when exposed to an atmosphere having a relative humidity of 20–30%.

4. A quantitative relative humidity indicator consisting essentially of silica gel impregnated with about 2%, on a dry basis, of cobalt iodide, said indicator changing color when exposed to an atmosphere having a relative humidity ranging from 20 to 30% and being prepared by the method of claim 3.

5. A method of preparing a quantitative relative humidity indicator comprising impregnating activated silica gel with about 2%, on a dry basis, of cobalt iodide, and drying the impregnated silica gel at a temperature of about 250° F., said indicator changing color when exposed to an atmosphere having a relative humidity of 40–60%.

6. A quantitative relative humidity indicator consisting essentially of silica gel impregnated with about 2%, on a dry basis, of cobalt iodide, said indicator changing color when exposed to an atmosphere having a relative humidity ranging from 40 to 60% and being prepared by the method of claim 5.

PAUL BELL DAVIS.

REFERENCES CITED

The following references are of record in the file of this patent:

UNITED STATES PATENTS

| Number | Name | Date |
|---|---|---|
| 1,947,381 | Connolly et al. | Feb. 13, 1934 |
| 1,976,875 | Connolly et al. | Oct. 16, 1934 |
| 2,210,862 | Tronstad | Aug. 6, 1940 |
| 2,214,354 | Snelling | Sept. 10, 1940 |

FOREIGN PATENTS

| Number | Country | Date |
|---|---|---|
| 280,934 | Great Britain | Feb. 18, 1929 |
| 345,672 | Great Britain | Mar. 23, 1931 |
| 393,094 | Great Britain | June 1, 1933 |
| 437,139 | Great Britain | Oct. 24, 1935 |

OTHER REFERENCES

The Chemical Trade Journal and Chemical Engineer, July 14, 1939, page 31.